United States Patent
Miyata (10) Patent No.: US 8,020,175 B2
(45) Date of Patent: *Sep. 13, 2011

(54) DATA PROCESSING DEVICE FOR RENAMING VIRTUAL DEVICE

(75) Inventor: Yuji Miyata, Kitanagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 1142 days.

This patent is subject to a terminal disclaimer.

(21) Appl. No.: 11/668,213

(22) Filed: Jan. 29, 2007

(65) Prior Publication Data

US 2007/0177202 A1    Aug. 2, 2007

(30) Foreign Application Priority Data

Jan. 30, 2006   (JP) .............................. 2006-021201

(51) Int. Cl.
G06F 9/44   (2006.01)
(52) U.S. Cl. ..................................... 719/321; 719/327
(58) Field of Classification Search .................. 719/310, 719/321, 327
See application file for complete search history.

(56) References Cited

U.S. PATENT DOCUMENTS

| | | | |
|---|---|---|---|
| 5,353,399 A | 10/1994 | Kuwamoto et al. | |
| 5,845,078 A | 12/1998 | Tezuka et al. | |
| 5,996,029 A | 11/1999 | Sugiyama et al. | |
| 6,177,934 B1 | 1/2001 | Sugiura et al. | |
| 6,184,998 B1 * | 2/2001 | Tebeka | 358/1.15 |
| 6,473,811 B1 | 10/2002 | Onsen | |
| 6,798,530 B1 | 9/2004 | Buckley et al. | |
| 7,231,435 B2 | 6/2007 | Ohta | |
| 7,287,253 B2 * | 10/2007 | Yamamura et al. | 717/176 |
| 7,310,690 B2 | 12/2007 | Yokota | |
| 7,779,168 B2 * | 8/2010 | Yamamura et al. | 710/8 |
| 2003/0066027 A1 | 4/2003 | Nakagiri | |
| 2004/0051743 A1 | 3/2004 | Gonsho | |
| 2004/0227973 A1 * | 11/2004 | Taylor | 358/1.15 |
| 2004/0230966 A1 | 11/2004 | Morris et al. | |
| 2005/0206938 A1 | 9/2005 | Oono | |
| 2006/0200644 A1 * | 9/2006 | Asada et al. | 711/205 |
| 2006/0206903 A1 * | 9/2006 | Lawrence et al. | 719/313 |
| 2007/0177178 A1 | 8/2007 | Miyata | |

(Continued)

FOREIGN PATENT DOCUMENTS

JP    7152507    6/1995

(Continued)

OTHER PUBLICATIONS

Decision of Rejection mailed Oct. 19, 2010 in Japanese Application No. 2006-021202 and English Translation thereof.

(Continued)

*Primary Examiner* — Van H Nguyen
(74) *Attorney, Agent, or Firm* — Banner & Witcoff, Ltd (57) ABSTRACT

A data processing device including a registering unit, a display unit, a usage frequency recording unit, and a virtual device renaming unit. The registering unit registers a plurality of communicable printers as a plurality of virtual devices. The display unit displays a plurality of virtual device names for the plurality of virtual devices. The usage frequency recording unit records usage frequencies of the virtual devices. The virtual device renaming unit changes at least one of virtual device names for the plurality of virtual devices to a device name representing the usage frequency of a corresponding virtual device recorded in the usage frequency recording unit.

32 Claims, 8 Drawing Sheets

U.S. PATENT DOCUMENTS

2007/0177198 A1    8/2007    Miyata

FOREIGN PATENT DOCUMENTS

| | | |
|---|---|---|
| JP | 9-006557 | 1/1997 |
| JP | 9-006558 | 1/1997 |
| JP | 2000076032 | 3/2000 |
| JP | 2000-293336 | 10/2000 |
| JP | 2001-056756 | 2/2001 |
| JP | 2001-282661 | 10/2001 |
| JP | 2001-306279 | 11/2001 |
| JP | 2003271286 | 9/2003 |
| JP | 2004110127 | 4/2004 |
| JP | 2005085132 | 3/2005 |
| JP | 2005267544 | 9/2005 |
| JP | 2006-011831 | 1/2006 |
| JP | 2007-200254 | 8/2007 |
| JP | 2007-200255 | 8/2007 |

OTHER PUBLICATIONS

Japanese Office Action dated Mar. 23, 2010 in Japanese Application No. 2006-021202 and English translation thereof.

Japanese Office Action dated Mar. 16, 2010 in Japanese Application No. 2006-021203, and English translation thereof.

Extended European Search Report dated Mar. 4, 2008 in application No. 072502971.4.

European Search Report dated Feb. 19, 2009 in application No. 07250309.7.

* cited by examiner

| No. | ORIGINAL VIRTUAL DEVICE NAME | INSTALLATION DATE AND TIME |
|---|---|---|
| 1 | XXXX1500 Printer | 2004/08/11   12:10 |
| 2 | YYYY4800CX | 2004/08/11   10:40 |
| 3 | ZZZZ 190SF | 2005/01/15   16:20 |
| 4 | XXXX1500 Printer (copy 2) | 2005/09/24   09:00 |
| 5 | YYYY4900CX | 2005/11/08   13:50 |

FIG.4

| VIRTUAL DEVICE No. | DATE | TIME | PAGES |
|---|---|---|---|
| 2 | 2005/11/08 | 12:30 | 10 |
| 1 | 2005/11/08 | 13:00 | 4 |
| 2 | 2005/11/08 | 14:15 | 8 |
| 5 | 2005/11/08 | 18:00 | 5 |
| 3 | 2005/11/08 | 19:30 | 20 |
| 4 | 2005/11/09 | 8:50 | 9 |
| 2 | 2005/11/09 | 14:30 | 30 |
| 4 | 2005/11/09 | 16:05 | 10 |

FIG.5

| RANK | VIRTUAL DEVICE No. | NUMBER OF PRINTING OPERATIONS | TOTAL PRINTED PAGES |
|---|---|---|---|
| 1 | 2 | 3 | 42 |
| 2 | 4 | 2 | 19 |
| 3 | 3 | 1 | 20 |
| 4 | 1 | 1 | 4 |
| 0 | 5 | 1 | 5 |

FIG.6

| No. | ORIGINAL VIRTUAL DEVICE NAME | MODIFIED VIRTUAL DEVICE NAME |
|---|---|---|
| 1 | XXXX1500 Printer | XXXX1500 Printer |
| 2 | YYYY4800CX | 1. YYYY4800CX |
| 3 | ZZZZ 190SF | 3. ZZZZ 190SF |
| 4 | XXXX1500 Printer (copy 2) | 2. XXXX1500 Printer (copy 2) |
| 5 | YYYY4900CX | 0. YYYY4900CX-New |

DATA PROCESSING DEVICE FOR RENAMING VIRTUAL DEVICE

CROSS REFERENCE TO RELATED APPLICATIONS

This application claims priority from Japanese Patent Application No. 2006-21201 filed Jan. 30, 2006. The entire content of priority application is incorporated herein by reference.

TECHNICAL FIELD

The present invention relates to a data processing device for renaming virtual device and a computer readable medium containing a virtual device renaming program that enables the user to select one of a plurality of virtual devices registered in a data processing device more easily.

BACKGROUND

In recent years, personal computers and other data processing devices have been used in an environment allowing access to a plurality of printers. For example, a system that has a plurality of data processing devices connected to a plurality of printers via a network may be set up so that each of the data processing devices can access each of the printers. With this system, virtual devices corresponding to the printers are registered in the data processing device so that the user can specify which of the printers is the output destination.

Further, a plurality of virtual devices may be registered in a data processing device, even when the data processing device uses only a single printer as the output destination. For example, when a plurality of different print settings is used frequently, it is possible to register a plurality of virtual devices for a single printer such that each virtual device has different default settings. If the user wishes to use a variety of print settings for a single printer in this way, the user can perform printing with the desired print settings simply by selecting one of the virtual devices having the desired print settings as the default settings. Therefore, the user need not modify the printer settings for each print operation regarding whether to use the duplex print function, whether to use the color print function, and which of the paper cassettes to use, thereby eliminating the troublesome operations involved in modifying print settings.

However, if the number of virtual devices registered in a single data processing device becomes excessive under these circumstances, the user must search for the desired virtual device from numerous virtual devices. As a result, the user must take more time to find the desired virtual device, reducing user-friendliness when selecting virtual devices.

To resolve this problem, technologies such as that disclosed in Japanese Patent Application Publication No. 2005-267544 have been proposed for managing the frequency of printer usage and deleting virtual devices registered in association with printers having low usage frequency. With this technology, the data processing device does not display virtual devices having a low usage frequency as selections when the user is prompted to select one of a plurality of virtual devices. The technology is expected to facilitate the user in selecting a virtual device by reducing the number of choices.

SUMMARY

However, even after reducing the number of virtual devices displayed as choices using the technology disclosed in Japanese Patent Application Publication No. 2005-267544, in some cases the number of remaining virtual devices is still large. In such cases, finding the desired virtual device can still be difficult.

For example, when the most frequently used virtual devices have been determined to some extent, in most cases the user will want to select one of these frequently used virtual devices. However, if many virtual devices with similar names have been registered in the data processing device, the user may have difficulty determining which virtual device to select and may occasionally make the wrong choice.

In view of the foregoing, it is an object of the present invention to provide a data processing device for renaming virtual device and a computer readable medium containing a virtual device renaming program that aids a user in selecting a frequently used virtual device when a plurality of virtual devices have been registered in a data processing device.

To achieve the above and other objects, one aspect of the invention provides a data processing device including a registering unit, a display unit, a usage frequency recording unit, and a virtual device renaming unit. The registering unit registers a plurality of communicable printers as a plurality of virtual devices. The display unit displays a plurality of virtual device names for the plurality of virtual devices. The usage frequency recording unit records usage frequencies of the virtual devices. The virtual device renaming unit changes at least one of virtual device names for the plurality of virtual devices to a device name representing the usage frequency of a corresponding virtual device recorded in the usage frequency recording unit.

In another aspect of the invention, there is provided a computer readable medium containing a virtual device renaming program for instructing a data processing device capable of registering a plurality of communicable printers as a plurality of virtual devices, displaying a plurality of virtual device names for the plurality of virtual devices, prompting a user to select one of the plurality of virtual devices, and transmitting print data to a printer corresponding to a selected virtual device. The virtual device renaming program includes a program for recording usage frequencies of the virtual devices and a program for renaming at least one of virtual device names for the plurality of virtual devices to a device name representing the usage frequency of a corresponding virtual device recorded by the recording program.

DETAILED DESCRIPTION

Next, a data processing device for renaming virtual device and a computer readable medium containing a virtual device renaming program according to a preferred embodiment of the present invention will be described.

[Overall Structure of the System]

Figure 1:
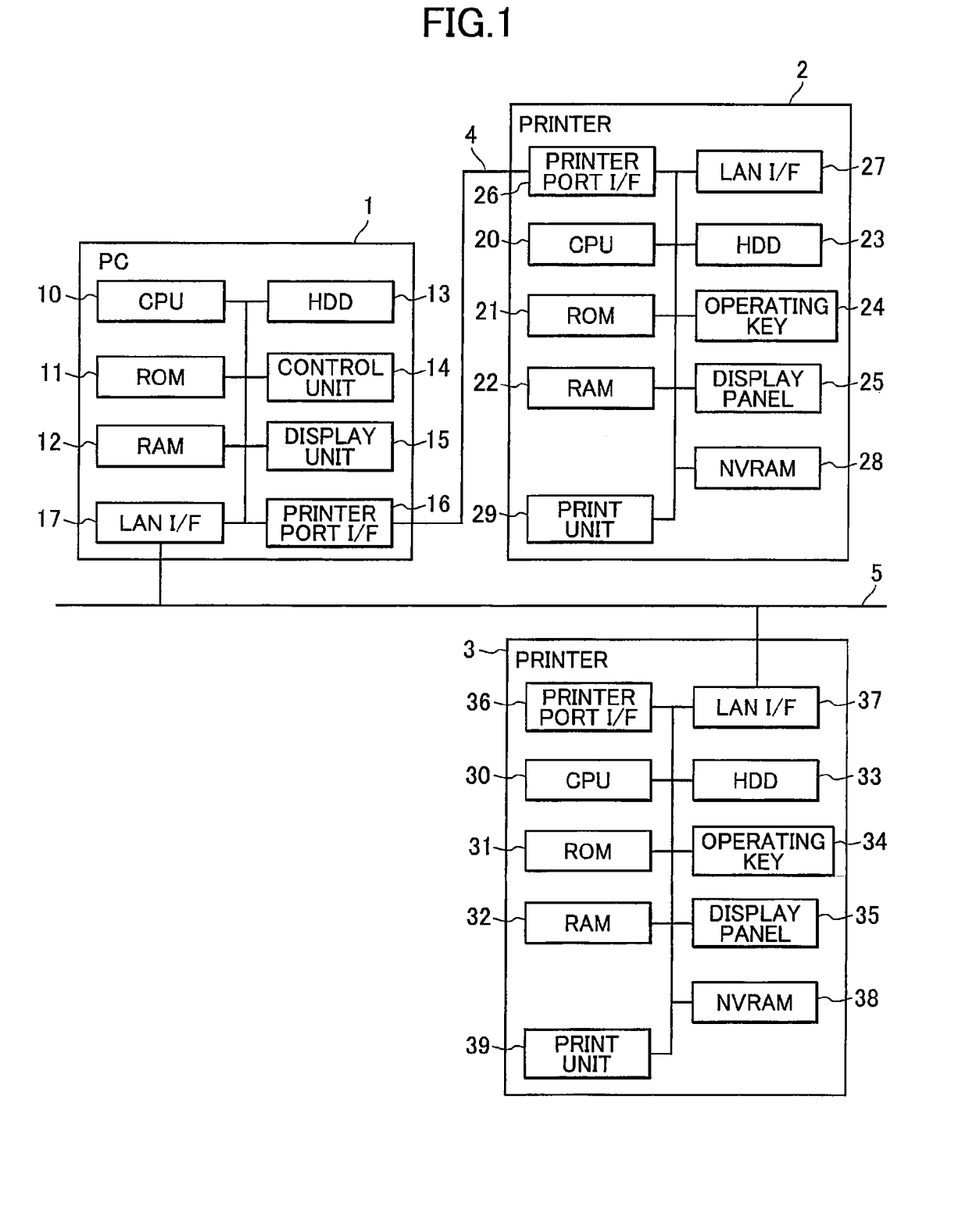
FIG. 1 is a block diagram showing the hardware structure of a system comprising a personal computer for executing a virtual device renaming program according to a preferred embodiment of the present invention, and printers.

FIG. 1 is a block diagram showing the general structure of a system including a personal computer 1. The personal computer 1 functions as a data processing device for executing processes corresponding to the virtual device renaming program according to the preferred embodiment.

The personal computer 1 can communicate with a plurality of printers. FIG. 1 shows two printers 2 and 3 that are connected to the personal computer 1 in different ways Specifically, the printer 2 is directly connected to the personal computer 1 through a printer cable 4 as a local printer, while the printer 3 communicates with the personal computer 1 through a LAN cable 5 as a network printer.

The personal computer 1 can also communicate with printers other than the printers 2 and 3. However, such printers are not shown in FIG. 1 since the connection configurations are identical to those used for the printers 2 and 3. In a process for renaming virtual device described later, the personal computer 1 will be capable of using five printers, with five virtual devices corresponding to five printers registered in the personal computer 1.

As shown in FIG. 1, the personal computer 1 in the system described above includes a CPU 10, a ROM 11, a RAM 12, a hard disk drive 13, a control unit 14, a display unit 15, a printer port interface 16, and a LAN (local area network) interface 17.

The CPU 10 executes various calculations and processes for controlling components in the personal computer 1 according to programs stored in the ROM 11 and RAM 12. The CPU 10 also executes a process for renaming virtual device described later.

The ROM 11 is a storage device capable of saving stored contents when a power switch of the personal computer 1 is turned off. The ROM 11 stores BIOS (Basic Input/Output System) data and other read-only data that is normally not updated.

The RAM 12 is a storage device employed as a main memory or the like directly accessed by the CPU 10. Operating system, applications programs, and the like are read into the RAM 12 from the hard disk drive 13. The RAM 12 also stores results of computations performed by the CPU 10 and data read from the hard disk drive 13. When executing the process to rename virtual device described later, the CPU 10 reads a virtual device renaming program into the RAM 12 from the hard disk drive 13 and executes the process for renaming virtual device based on the virtual device renaming program stored in the RAM 12.

The hard disk drive 13 functions to save the operating system, various application programs, and various data files, as well as the virtual device renaming program mentioned above.

The control unit 14 is an input device for inputting various user instructions. For example, the control unit 14 is configured of a keyboard and various pointing devices, such as a mouse.

The display unit 15 is an output device for presenting various data to the user For example, the display unit 15 may be configured of a liquid crystal display capable of displaying color images.

The printer port interface 16 is an interface capable of connecting with a printer. For example, the printer port interface 16 may be configured of a serial interface such as a USB (Universal Serial Bus) interface, or a parallel interface such as an IEEE 1284 interface.

The LAN interface 17 is an interface for communicating with printers or other peripheral devices on a network via a LAN cable.

In the preferred embodiment, Windows (registered trademark) is installed on the personal computer 1 as the operating system. Since the various functions of the Windows operating system are well known in the art, a detailed description of these functions will not be described herein. However, the following description presupposes that the personal computer 1 possesses the various functions provided by Windows.

The printer 2 includes a CPU 20, a ROM 21, a RAM 22, a hard disk drive 23, operating keys 24, a display panel 25, a printer port interface 26, a LAN interface 27, a nonvolatile RAM 28, and a print unit 29.

The CPU 20 executes various calculations and control processes for controlling components in the printer 2 according to control programs stored in the ROM 21.

The ROM 21 is a storage device capable of saving stored contents when a power switch of the printer 2 is switched off. In addition to the control programs mentioned above, the ROM 21 stores various read-only data that is normally not updated.

The RAM 22 is a storage device employed as the main memory or the like directly accessed by the CPU 20. Various data generated through computations by the CPU 20 are temporarily stored in the RAM 22.

The hard disk drive 23 is a storage device for storing a large volume of data that cannot be stored in the RAM 22.

The operating keys 24 are input devices that the user operates manually to issue instructions to the printer 2.

The display panel 25 is configured of a small liquid crystal display that can display settings and status of the printer 2 and other data.

The printer port interface 26 is capable of connecting with a personal computer and has the same standard as the printer port interface 16 of the personal computer 1. For example, the printer port interface 26 may be configured of a serial interface such as the USB interface, or a parallel interface such as the IEEE 1284 interface.

The LAN interface 27 is an interface for communicating with a personal computer on a network via a LAN cable.

The nonvolatile RAM 28 is a storage device for storing variable settings related to the printer 2 and other data that is preferably not lost when the power to the printer 2 is switched off.

The print unit 29 is configured of a conveying mechanism for conveying a sheet-like medium such as a recording paper from a feeding section to a discharging section, a recording mechanism for recording images on the medium while the conveying mechanism conveys the medium along a conveying path, and the like.

The printer 3 includes a CPU 30, a ROM 31, a RAM 32, a hard disk drive 33, operating keys 34, a display panel 35, a printer port interface 36, a LAN interface 37, a nonvolatile RAM 38, and a print unit 39. The components constituting the printer 3 are identical to those in the printer 2 and, hence, a description of these components will not be repeated.

[Process for Renaming Virtual Devices]

Figure 2:
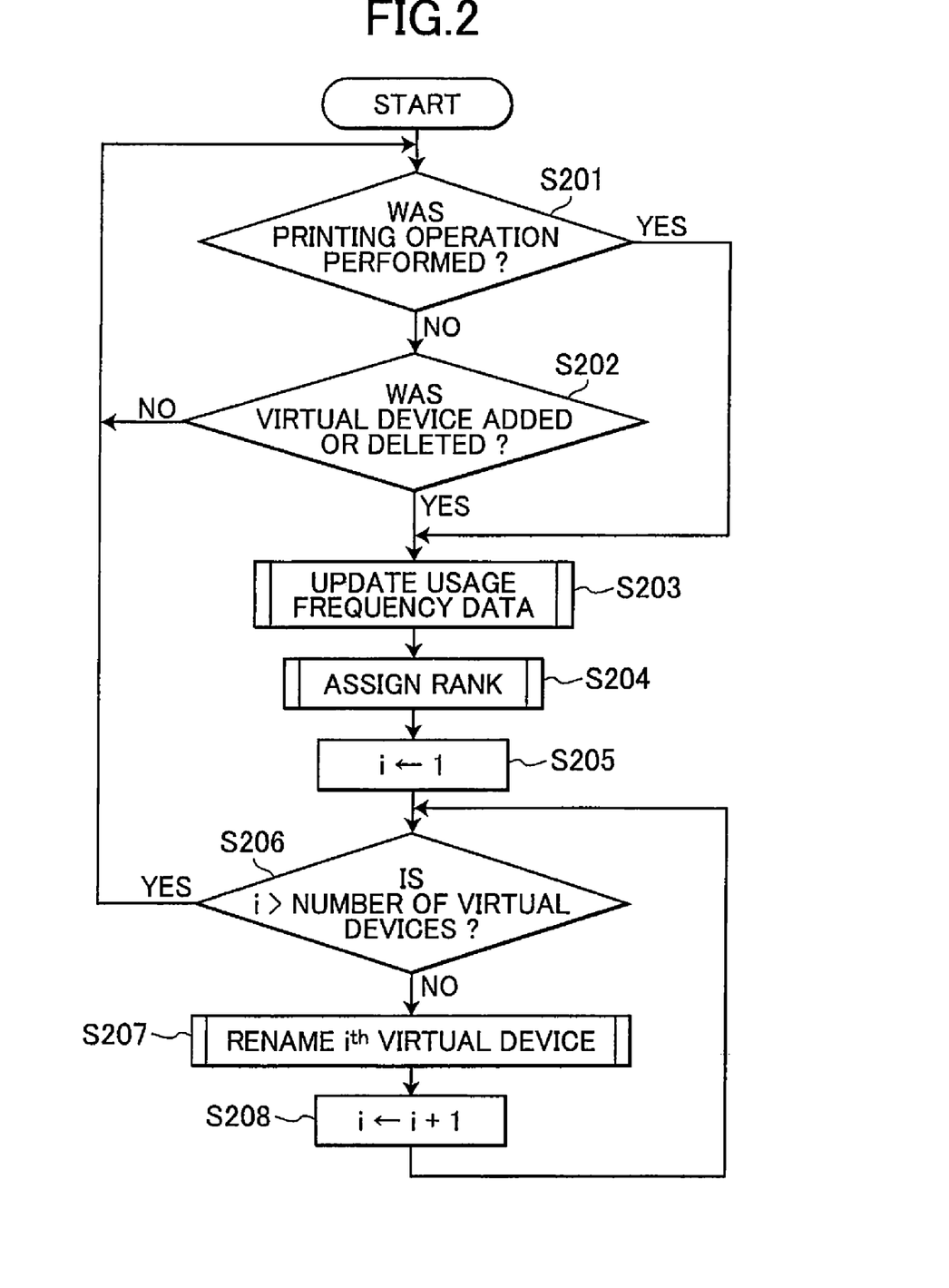
FIG. 2 is a flowchart illustrating steps in the virtual device renaming program according to the preferred embodiment of the present invention.

Next, the process for renaming virtual device executed by the CPU 10 in the personal computer 1 will be described with reference to the flowchart in FIG. 2. While there is no particular restriction on the timing at which this process is started, the process in the preferred embodiment is configured as a resident process that begins executing when the personal computer 1 is started.

Figure 3:
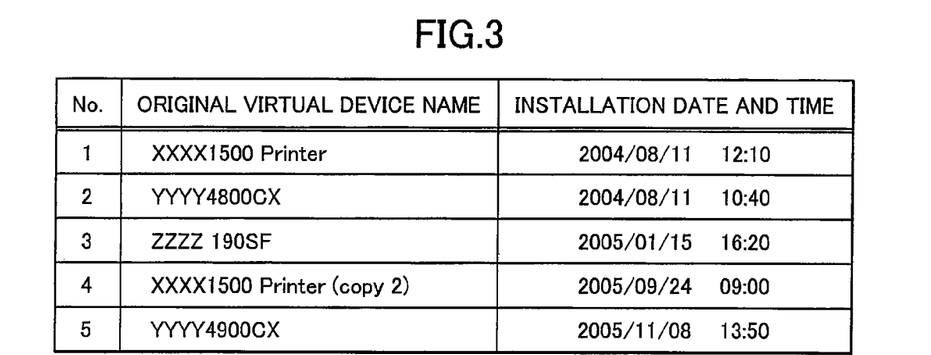
FIG. 3 is a table listing the names of virtual devices and their installation dates and times according to the preferred embodiment of the present invention.

The following description addresses a case in which five virtual devices shown in FIG. 3 have been installed in the personal computer 1. That is, the personal computer 1 is capable of using five printers. When each printer driver is installed on the personal computer 1, the name of the printer driver, the name of a file storing the printer driver program, and the like are registered in a registry (storage area managed by the operating system) of the personal computer 1. This process is equivalent to installing a virtual device on the personal computer 1. Thereafter, when an application program outputs print data, the user can specify a virtual device registered in the personal computer 1 as the output destination in order to output the print data to the printer corresponding to that virtual device. In selecting a virtual device as the output destination, the user views names of the virtual devices and selects a desired device. Here, the names of the virtual devices viewed by the user are the names of printer drivers registered in the registry.

Figure 4:
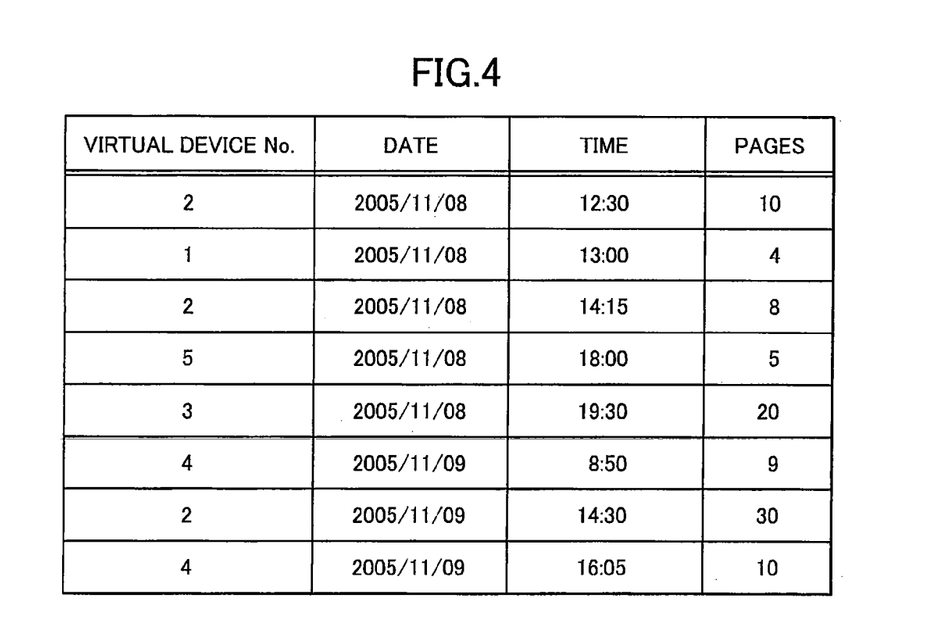
FIG. 4 is a table listing log entries regarding the usage status of the virtual devices (printers) according to the preferred embodiment of the present invention.

In the following description, usage conditions of the printers (virtual devices) shown in FIG. 4 are recorded in a log file saved on the hard disk drive 13 of the personal computer 1 each time the personal computer 1 outputs data to be printed.

In S201 at the beginning of the process for renaming virtual devices, the CPU 10 confirms whether a printing operation was performed. If the CPU 10 determines that a printing operation was performed (S201: YES), then the CPU 10 advances to S203. If not (S201: NO), then in S202 the CPU 10 determines whether a virtual device has been added or deleted. The CPU 10 determines in S202 that a virtual device has been added when a virtual device has newly been installed and determines that a virtual device has been deleted when a virtual device has been uninstalled.

If the CPU 10 determines that a virtual device has been added or deleted (S202: YES), then the CPU 10 advances to S203. If not (S202: NO), then the CPU 10 returns to S201.

Hence, by looping between the processes in S201 and S202, the CPU 10 monitors whether a printing operation has been executed and whether a virtual device has been added or deleted. The CPU 10 advances to S203 when a printing operation has been performed (S201: YES) or when a virtual device has been added or deleted (S202: YES)

Upon advancing to S203, the CPU 10 updates usage frequency data. While the process for updating the usage frequency data will be described later in greater detail, the CPU 10 updates data related to the usage frequency of the virtual devices registered in the personal computer 1 (see FIG. 3) to the most recent data through the process of S203.

Figure 5:
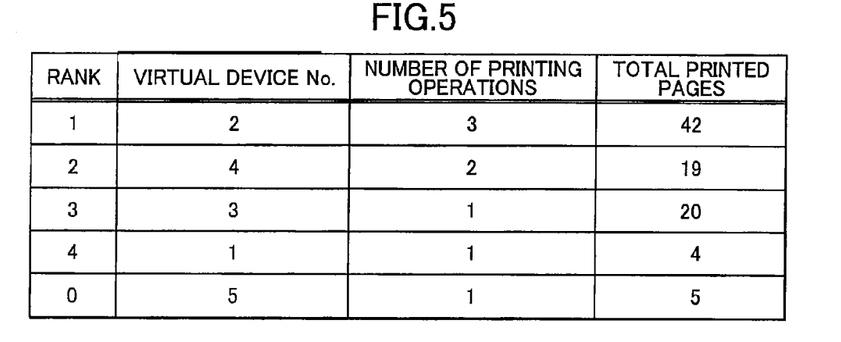
FIG. 5 is a table listing data used for determining usage frequency and ranks determined based on this data according to the preferred embodiment of the present invention.

In S204 the CPU 10 assigns a rank to the virtual devices based on the usage frequency data updated in S203. In other words, the virtual devices are ranked according to frequency of use. For example, the ranks and usage frequency data shown in FIG. 5 are generated from the log entries shown in FIG. 4. While the process of S204 for assigning rank will be described later in greater detail, in the preferred embodiment the CPU 10 assigns ranks 1-4 to the virtual devices having device numbers 1-4 shown in FIG. 5 based on usage frequency (number of printing operations and total number of printed pages) through the process of S204. Further, a rank of 0 unrelated to usage frequency has been assigned to virtual device No. 5, since the virtual device No. 5 has only recently been installed, as will be described later in greater detail.

Next, in S205 the CPU 10 initializes a counter i to 1. In S206 the CPU 10 determines whether the counter i is greater than the number of virtual devices. Since there are five virtual devices in the example of the preferred embodiment, in the process of S206 the CPU 10 compares the value stored in the counter i variable to 5. At this point of the description, the counter i has just been initialized in the process of S205 and, therefore, is not greater than 5 (S206: NO). In this case, the CPU 10 advances to S207.

Figure 6:
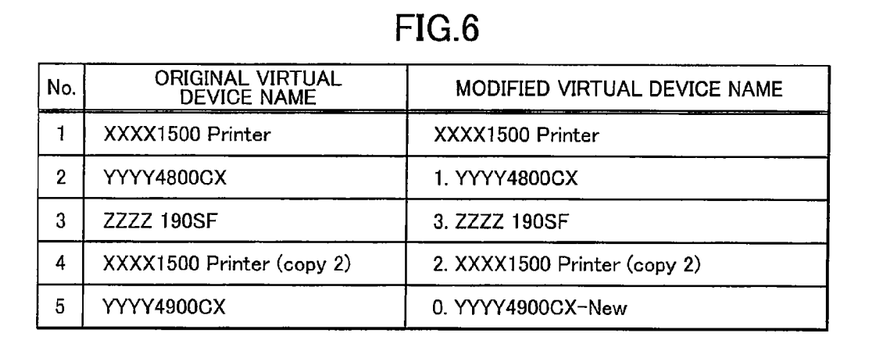
FIG. 6 is a table listing the original names and modified names of the virtual devices according to the preferred embodiment of the present invention.

In S207 the CPU 10 modifies the virtual device name of the $i^{th}$ virtual device shown in FIG. 3 based on the value stored in the counter i. Through the process in S207, the virtual device names are modified based on their usage frequency data. A specific example of virtual device names modified according to the preferred embodiment is shown in FIG. 6. While the process of S207 for modifying names will be described later in greater detail, in the preferred embodiment the virtual device name is modified in the process of S207 when the rank assigned in the process of S204 is no greater than a predetermined rank (3 in the preferred embodiment, but a user-predetermined value), Hence, in the virtual devices shown in FIG. 5, devices having a usage frequency rank of 3 or less (virtual devices assigned the ranks 1-3) and the virtual device assigned the rank 0 unrelated to usage frequency are renamed. The names are modified so that the rank is added to the front of the original virtual device name.

In S208 the CPU 10 increments the counter i by 1 and subsequently returns to S206 after completing the process in S207. By looping back in this way, the processes in S206-S208 are repeated for each of the virtual devices. Upon returning to S206 after repeating the processes of S206-S208 for the number of virtual devices, the counter i is now greater than the number of virtual devices (S206: YES), indicating that the process has been completed for all virtual devices. Accordingly, the CPU 10 returns to S201.

Thereafter, the CPU 10 again loops through the processes of S201 and S202 in order to monitor printing operations and the addition or deletion of virtual devices. The CPU 10 executes the processes of S203-S208 each time a printing operation is performed or a virtual device is added or deleted.

As a result of performing the process for renaming virtual devices described above, the names of the virtual devices registered in the personal computer 1 are modified as shown in FIG. 6. The "modified virtual device names" shown in FIG. 6 are displayed when prompting the user to select a virtual device.

Figure 7:
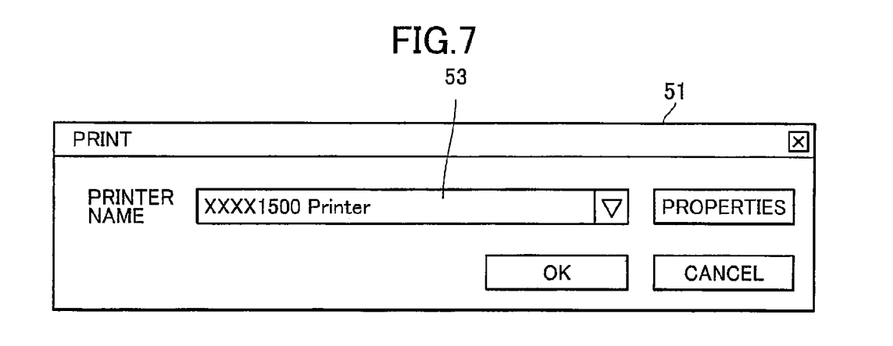
FIG. 7 is an explanatory diagram showing a Print dialog box according to the preferred embodiment of the present invention.

More specifically, when the user performs a prescribed operation in order to use the printer function of an application program, for example, a Print dialog box 51, such as that shown in FIG. 7, is displayed on the display unit 15 of the personal computer 1. A list box 53 is provided in the Print dialog box 51 for allowing the user to select a desired virtual device. When the Print dialog box. 51 is first displayed, the currently selected virtual device name is displayed in the list box 53.

Figure 8:
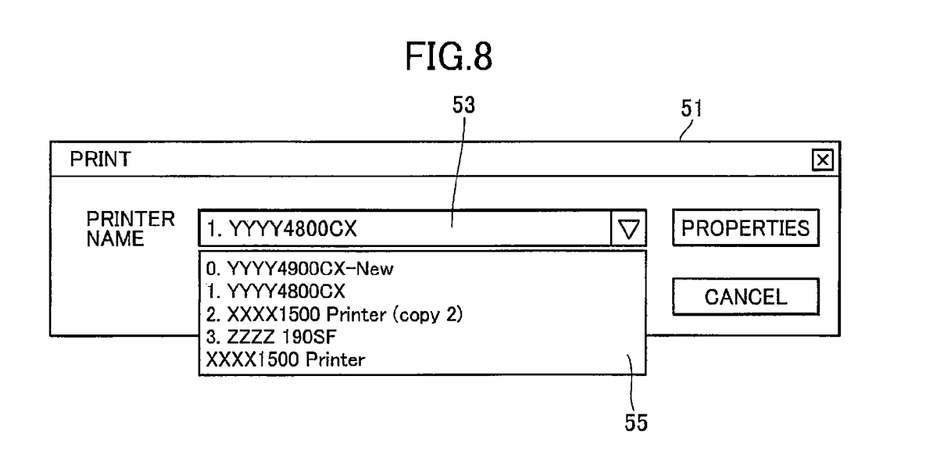
FIG. 8 is an explanatory diagram showing the Print dialog box when a list box has been opened therein according to the preferred embodiment of the present invention.

If the user wishes to select a different virtual device, the user operates a pointing device to click on the mark on the right end of the list box 53 (or performs keyboard operations or the like set as an equivalent function). This operation displays a list 55 near the list box 53 (directly below the list box 53 in the present example), as shown in FIG. 8.

The list 55 includes a list of names for a plurality of alternative virtual devices. Here, the virtual device names are ordered by character code according to the specifications of the Windows OS. As shown in FIG. 6, the virtual device names have been modified by adding the ranks (a ranking process will be described later in greater detail) to a head of the original virtual device name. Hence, due to the ranks 1-3 attached to the beginning of the device names, the virtual devices are listed in the list 55 shown in FIG. 8 beginning in order from highest frequency of use.

As will be described later, the rank 0 is assigned to virtual devices that have recently been installed. Therefore, the names of newly installed virtual devices are listed above the modified virtual device names having ranks 1-3.

In the preferred embodiment, characters selected as ranks for the modified virtual devices are antecedent to the characters used in the virtual device names with respect to the character code. Therefore, names of virtual devices that were not modified in the process for renaming virtual devices are listed below the modified virtual device names in the list 55.

Hence, virtual devices that have just been installed (assigned the rank 0) are displayed at the top of the list 55, followed by virtual devices whose usage frequencies are among the top three (virtual devices assigned ranks 1-3) arranged in order from highest usage frequency, and lastly virtual devices whose names have not been modified arranged in order of their character codes.

[Detailed Description of the Process for Updating Usage Frequency Data (S203)]

Figure 9:
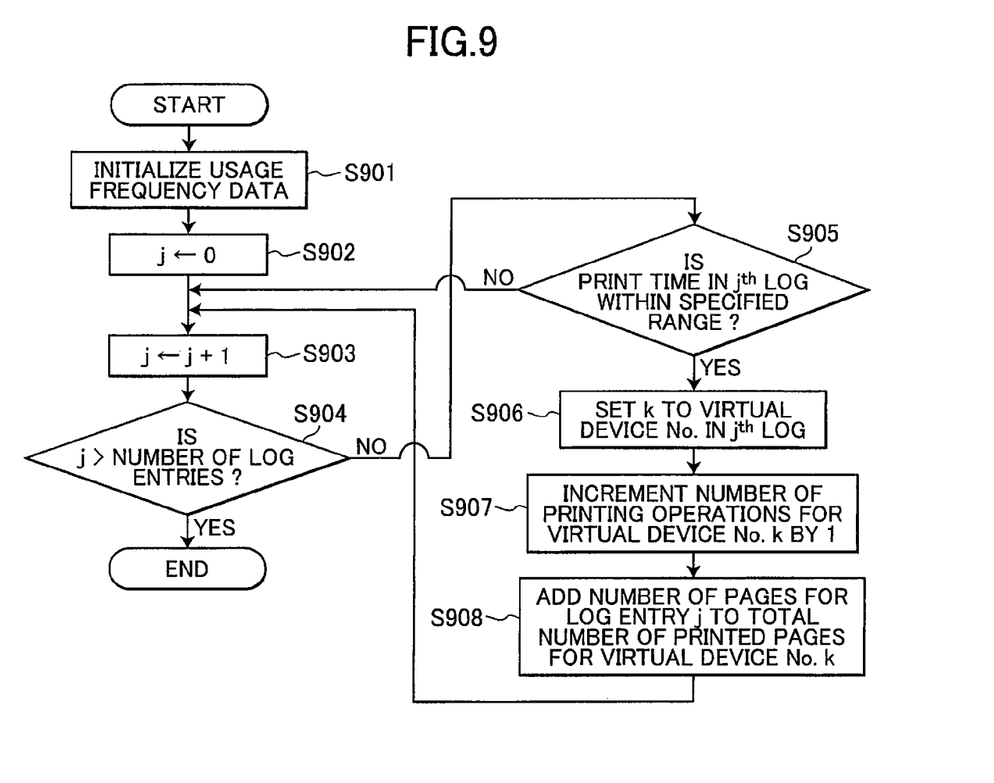
FIG. 9 is a flowchart illustrating steps in a process for updating usage frequency data according to the preferred embodiment of the present invention.

Next, the process for updating usage frequency data in S203 will be described with reference to the flowchart in FIG. 9.

At the beginning of the process in S901, the CPU 10 initializes usage frequency data. An example of usage frequency data is shown in FIG. 5. In S901 the CPU 10 resets all usage frequency data to 0.

In S902 the CPU 10 initializes a counter j to 0 and in S903 increments the counter j by 1. In S904 the CPU 10 determines whether the value stored in the counter j is greater than the total number of entries in the log. An example of log data is shown in FIG. 4. In the example shown in FIG. 4, the total number of log entries is 8. As long as the total number of log entries is not 0, the CPU 10 will determine that the counter j is not greater than the number of log entries at least once (S904: NO) and will advance to S905.

Upon advancing to S905, the CPU 10 determines whether the print time in the $j^{th}$ log entry falls within a specified range based on the value stored in the counter j. The specified range in the process of S905 is a value preset by the user. For example, the user may define a period such as the past month or the past week. In the preferred embodiment, the user-specified range is saved in a settings file, for example, and the CPU 10 makes the determination in S905 based on the value read previously from this settings file. If the specified range has been set to the past week, then the CPU 10 determines in S905 whether the print time in the $j^{th}$ log entry falls within the range from one week ago to the current time. The CPU 10 returns to S903 if the print time does not fall within the specified range (S905: NO) and advances to S906 if the print time does fall within this specified range (S905: YES).

In S906 the CPU 10 sets a variable k to the virtual device number in the $j^{th}$ log entry. For example, if the value of the counter j is 1, then, using the example log entries in FIG. 4, the variable k is set to 2 that is the virtual device number in the first log entry. In S907 the CPU 10 increments the number of printing operations for the virtual device having the device number k by 1. In S908 the CPU 10 adds the number of printed pages in the $j^{th}$ log entry to the total number of printed pages for the virtual device having the device number k. Using the log entries shown in FIG. 4 as an example, when the value of the counter j is 1, the CPU 10 sets the virtual device having the device number 2 as the target device. The CPU 10 increments the number of printed pages for the target virtual device by 1 in S907 and adds 10 to the total number of printed pages for the target virtual device in S908.

After completing the processes in S906-S908, the CPU 10 returns to S903 and continues to loop through the processes of S903-S908 as long as a negative determination is made in S904. During this loop, the CPU 10 skips the processes in S906-S908 when the print time of the log is outside the specified range (for example, a log not recorded in the past week), and accumulates the number of printing operations and the total number of printed pages in the processes of S906-S908 when the print time in the log falls within the specified range. After completing the loop for all log entries, the value of the counter j exceeds the total number of log entries, resulting in a positive determination in S904 (S904: YES). Accordingly, the CPU 10 ends the process for updating usage frequency data.

[Details of the Ranking Process]

Figure 10:
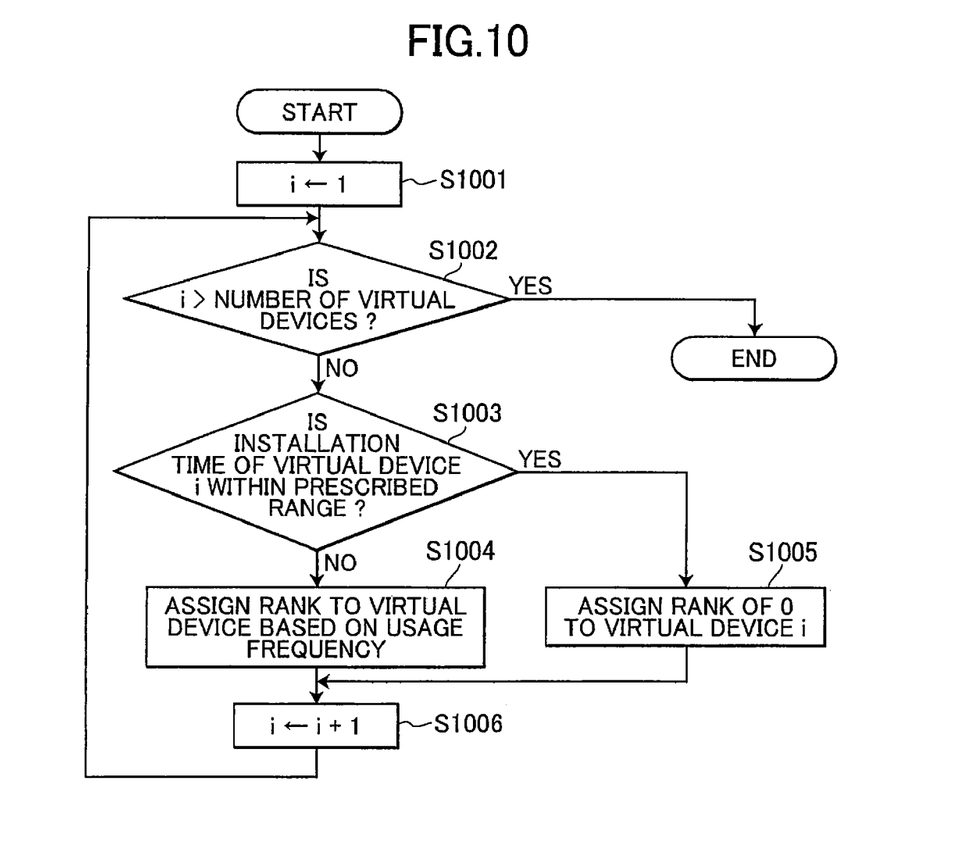
FIG. 10 is a flowchart illustrating steps in a ranking process according to the preferred embodiment of the present invention.

Next, the ranking process of S204 will be described with reference to the flowchart in FIG. 10.

In S1001 at the beginning of the ranking process, the CPU 10 initializes a counter i to 1. In S1002 the CPU 10 determines whether the value stored in the counter i is greater than the number of installed virtual devices. When the virtual devices shown in FIG. 3 are installed in the personal computer 1, the number of virtual devices is 5. As long as the number of virtual devices is not 0, the CPU 10 will make a negative determination in S1002 at least once. If the CPU 10 determines that the counter i is not greater than the number of virtual devices (S1002: NO), then the CPU 10 advances to S1003.

In S1003 the CPU 10 sets the $i^{th}$ virtual device shown in FIG. 3 as the target device based on the value stored in the counter i and determines whether the time that the target virtual device was installed falls within a prescribed range. The prescribed range used in S1003 is a range that has been preset by the user. For example, the user may set a range such as the past month or the past week In the preferred embodiment, the user-prescribed range is saved in a settings file, for example, and the CPU 10 performs the determination in S1003 using a value previously read from the settings file. If the prescribed range has been set to the past month, then the CPU 10 determines in S1003 whether the installation time for the $i^{th}$ virtual device falls between a point one month ago and the current time.

If the CPU 10 determines in S1003 that the installation time does not fall within the prescribed range (S1003: NO), then in S1004 the CPU 10 assigns a rank to the virtual device based on the usage frequency. More specifically, the rank assigned in the preferred embodiment is a numerical value corresponding to the rank of usage frequency. This rank is determined based on the number of printing operations accumulated in S907, where the device having printed the largest number of pages receives the top rank. When more than one virtual device has the same number of printing operations, the rank is further determined based on the total number of printed pages accumulated in S908, with the virtual device having the largest total number of printed pages receiving the top rank.

However, if the CPU 10 determines in S1003 that the installation time falls within the prescribed range (S1003: YES), then in S1005 the CPU 10 sets the rank of the virtual device to 0. In other words, in S1005 the CPU 10 assigns the rank 0, which is even smaller than the value 1 used as the topmost rank in S1004.

After completing either S1004 or S1005, in S1006 the CPU 10 increments the counter i by 1 and returns to S1002. The CPU 10 loops through the processes of S1002-S1006 as long as a negative determination is made in S1002. After the CPU 10 completes this process for all virtual devices, the value of the counter i now exceeds the number of virtual devices, resulting in a positive determination in S1002 (S1002: YES) Accordingly, the CPU 10 ends the ranking process.

By performing the ranking process described above, ranks such as those shown in FIG. 5 are assigned in the personal computer 1. More specifically, virtual devices having the device numbers 1-4, which were not installed within the prescribed time range, are first sorted based on their number of printing operations. The ranks 1 and 2 are assigned in order to the virtual devices having the largest number of printing operations. Virtual devices Nos. 3 and 4, which have the same number of printing operations, are further sorted based on their total number of printed pages. Accordingly, the ranks 3 and 4 are assigned to these devices in order of the devices with the largest total number of printed pages. The rank 0 is assigned to the virtual device No. 5, whose installation time falls within the prescribed range, regardless of the number of printing operations and total number of printed pages accumulated for this device. The ranks assigned in this way are referenced in the process for renaming virtual devices of S2007, which will be described next in detail.

[Detailed Description of the Renaming Process (S207)]

Figure 11:
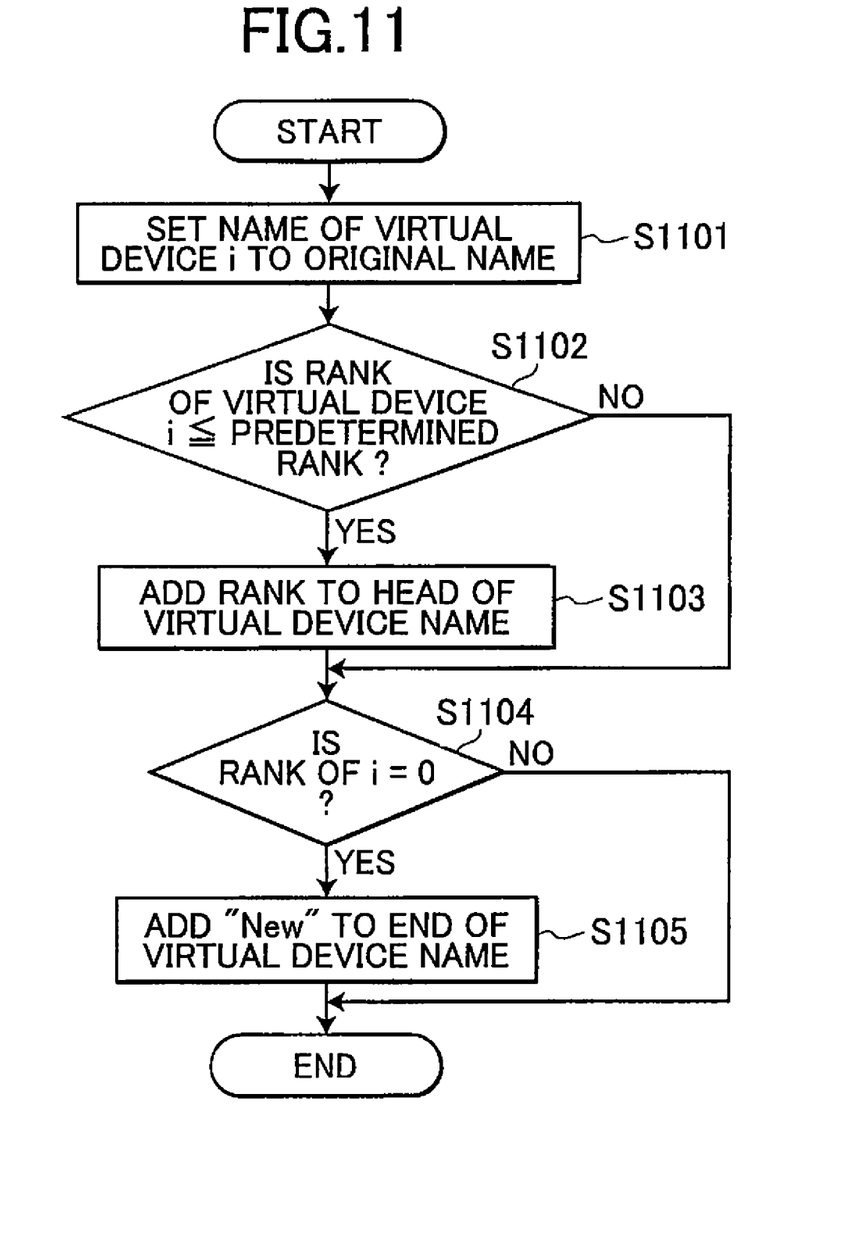
FIG. 11 is a flowchart illustrating steps in a renaming process according to the preferred embodiment of the present invention.

Next, the renaming process of S207 will be described with reference to the flowchart in FIG. 11. The renaming process is a part of the loop process of S206-S208 in the process for renaming virtual devices described above with reference to FIG. 2. Therefore, while the value of the counter i does not change during the renaming process described below, the value of the counter i is modified in S208 described above. Hence, the virtual device targeted for this process is one of the five virtual devices shown in FIG. 3 depending on the value of the counter i. Therefore, in the following detailed description of the renaming process, examples for the value of the counter i will be given as needed.

In S1101 at the beginning of the process, the CPU 10 first sets the $i^{th}$ virtual device shown in FIG. 3 as the target device based on the value of the counter i and resets the name of this target virtual device to the original virtual device name. For example, if the value stored in the counter i is 2, the initialized virtual device name will be "YYYY4800CX."

In S1102 the CPU 10 determines whether the rank of the $i^{th}$ virtual device is no greater than the predetermined rank. If the rank is not greater than the predetermined rank (S1102: YES), then in S1103 the CPU 10 adds the rank to the head of the virtual device name However, if the rank is greater than the predetermined rank (S1102: NO), then the CPU 10 skips S1102 and advances to S1103.

The predetermined rank used in the process of S1102 is a numerical value preset by the user. For example, the user sets the predetermined rank to 3 if it is desirable to only assign ranks to virtual devices having the top 3 usage frequencies. The numerical value of the user-predetermined rank is saved in a settings file, for example, and the CPU 10 performs the determination in S1102 using a value previously read from the settings file. The following description assumes that the predetermined rank has been set to 3.

The process performed in S1102-S1103 changes as follows according to the value of the counter i. For example, when the value of the counter i is 1, the CPU 10 sets the virtual device having device No. 1 in FIG. 5 to the process target in S1102. Here, through the ranking process of S204 described earlier (shown in detail in FIG. 10), the rank 4 is assigned to the virtual device No. 1. Since this value is greater than the predetermined rank 3, the CPU 10 reaches a negative determination in S1102. Accordingly, the CPU 10 skips the process in S1103 and, hence, the name of the virtual device No. 1 is not changed from "XXXX1500Printer" shown in FIG. 6. In other words, the modified virtual device name is the same as the original virtual device name.

However, when the value of the counter i is 2, then the CPU 10 sets virtual device No. 2 shown in FIG. 5 as the target of processing in S1102. Through the ranking process of S204 described above (shown in detail in FIG. 10), the CPU 10 assigns the rank 1 to the virtual device No. 2. Since this value is smaller than the predetermined rank 3, the CPU 10 makes a positive determination in S1102. Hence, in S1103 the CPU 10 adds the rank 1 to the head of the original virtual device name of "YYYY4800CX" shown in FIG. 6 for virtual device No. 2, changing the name to "1.YYYY4800CX."

Thereafter, the CPU 10 repeats the process of S1103 for counter i values of 3-5 in the same manner as that performed for the counter i value of 2, thereby adding the appropriate rank to the head of the respective virtual device name.

Hence, a rank is added to the head of the virtual device name only when the virtual device has a rank no greater than the predetermined rank specified by the user. While ranks were added to the head of device names for some of the virtual devices in this way, device names for the remaining virtual devices are left unchanged for the following reason.

For example, in a case where 20 virtual devices have been installed in a data processing device, the most frequently used virtual devices are listed in the top of the display and are easy to find. However, listing all 20 virtual devices in order of usage frequency may not be particularly useful for infrequently used devices listed toward the bottom, making such devices more difficult to find than when the devices are ordered alphabetically by their original names. Hence, it may be more convenient for the user to list infrequently used virtual devices in the usual alphabetical order.

By allowing the user to arbitrarily set the predetermined rank of virtual devices to be targeted in the ranking process described above, the target virtual devices are thus listed in order of rank, while non-target virtual devices are listed according to the alphabetical order of their original names. This method orders both frequently used devices and infrequently used devices in a way that facilitates searching by the user.

After completing the processes in S1102-S1103, in S1104 the CPU 10 determines whether the rank of the $i^{th}$ virtual device is 0. If the rank is 0 (S1104: YES), then in S1105 the CPU 10 adds a character string "New" to the end of the virtual device name, indicating that the virtual device has been recently installed. Subsequently, the CPU 10 ends the renaming process. However, if the rank is not 0 (S1104: NO), then the CPU 10 skips S1105 and simply ends the renaming process without further action.

The process performed in S1104-S1105 also changes as follows according to the value of the counter i. For example, when the value of the counter i is 1, the CPU 10 sets the virtual device having device No. 1 in FIG. 5 to the process target in S1104. Here, through the ranking process of S204 described earlier (shown in detail in FIG. 10), the rank 4 is assigned to virtual device No. 1. Since this value is greater than the predetermined rank 3, the CPU 10 reaches a negative determination in S1104. Accordingly, the CPU 10 skips the process in S1105 and, hence, the character string "New" is not added to the end of the device name for virtual device No. 1.

When the process is repeated thereafter for counter i values of 2-4, the CPU 10 skips the process in S1105 so that the character string "New" is also not added to the end of the device names for subsequent virtual devices.

However, when the value of the counter i is 5, then the CPU 10 sets virtual device No. 5 shown in FIG. 5 as the target of processing in S1104. Through the ranking process of S204 described above (shown in detail in FIG. 10), the CPU 10 assigns the rank 0 to virtual device No. 5, resulting in a positive determination in S1104. Hence, in S1105 the CPU 10 adds the character string "New" to the end of the device name for virtual device No. 5. As a result, in S1103 the CPU 10 adds the rank 0 to the head of the original virtual device name for virtual device No. 5, changing the name from "YYYY4900CX" shown in FIG. 6 to "0.YYYY4900CX," and adds the character string "New" to the end of the device name, changing the name to "0.YYYY4900CX-New."

Effects of the Embodiment

As described above, the CPU 10 executes the renaming process to change the device names of virtual devices registered in the personal computer 1 based on their usage frequency. By viewing the modified virtual device names, the user can easily determine the virtual devices that are frequently used, even when numerous virtual devices are listed as choices.

Therefore, even if the names of many virtual devices registered in the data processing device resemble the name of a frequently used virtual device prior to modifying the names, the user can easily find and select the frequently used virtual device when viewing the modified virtual device names, without the confusion that could lead to an incorrect selection. For example, the original virtual device names "XXXX1500Printer" and "XXXX1500Printer ($2^{nd}$ PRINTER)" displayed in FIG. 6 are very similar. If the user cannot clearly remember the difference between these virtual device names, it would not be easy to determine which is most frequently used. However, since the virtual device "XXXX1500Printer ($2^{nd}$ PRINTER)" is renamed to "2.XXXX1500Printer ($2^{nd}$ PRINTER)," the user can easily select the most frequently used virtual device by viewing the modified names, without the confusion that can lead to an incorrect choice.

Moreover, since a character string (numeral) representing the rank of usage frequency is displayed as part of the virtual device name, the user can easily select a frequently used virtual device by viewing the character strings. Further, since the character strings representing this rank are added to the head of the virtual device names, the most frequently used virtual devices are displayed in order of frequency beginning from the top position, thereby further facilitating the user in selecting a frequently used virtual device when a plurality of virtual device names is displayed.

Further, in S1102 the CPU 10 modifies virtual device names only for devices among the top three most frequently used and recently installed virtual devices. Accordingly, virtual device names are only changed for the most frequently used virtual devices for which such changes can be useful, while unnecessary changes are not performed on virtual device names for infrequently used virtual devices. Moreover, since the user can specify how many of the top ranked virtual devices to rename, the CPU 10 can rename only the number of virtual devices necessary for the user.

Further, the CPU 10 determines the usage frequency of the virtual devices in S905 based on data recorded within a user-specified time range. In this way, a virtual device that was used frequently in the past but infrequently of late will be treated as an infrequently used virtual device. Further, since the usage frequencies for a plurality of the virtual devices are determined based on data recorded within the specified time range, which time range is arbitrarily set by the user, usage outside of this time range is not considered when determining if a virtual device has been used frequently.

Further, in S1104 and S1105 the CPU 10 adds the identifying character array "New" to the end of the virtual device name for new virtual devices that have just been installed so that the user can easily recognize and select the new virtual device based on the identifying character array. Moreover, the CPU 10 determines new virtual devices in S1003 based on whether the virtual device was installed within a period of time prescribed by the user. Accordingly, the user can set this period of time during which virtual devices are treated as new virtual devices to a desired term.

Further, through the processes of S1003-S1005 and S1102-S1103, the CPU 10 adds a character array representing the rank of usage frequency to the head of device names for virtual devices other than new virtual devices, and adds the character array "0", which is displayed above the character arrays indicating the rank of usage frequency according to the character codes, to the head of the device name for a new virtual device. Hence, the new virtual device is displayed above the frequently used virtual devices when the CPU 10 orders the device names according to character code, facilitating the user in selecting the new virtual device.

Further, since the CPU 10 executes the renaming process in S201 when printing is performed using a virtual device, the virtual devices are renamed to reflect the most recent usage frequencies.

Further, since the CPU 10 executes the renaming process in S202 when a new virtual device has been installed, the user can easily select the new virtual device.

Further, since the CPU 10 executes the renaming process in S202 when a virtual device is uninstalled and updates the ranks of usage frequency, the user can select a virtual device based on the most recent ranks.

While the invention has been described in detail with reference to specific embodiments thereof, it would be apparent to those skilled in the art that many modifications and variations may be made therein without departing from the spirit of the invention, the scope of which is defined by the attached claims.

For example, the CPU 10 according to the preferred embodiment renames virtual devices including newly installed virtual devices. However, the CPU 10 may be configured to modify virtual device names based solely on the usage frequency, without determining whether the devices have been newly installed.

In the preferred embodiment described above, the user can arbitrarily set how many of the top virtual devices in usage frequency (the predetermined rank) to rename, the length of time (the prescribed time range) used to determine whether a virtual device has been newly installed, and the range of time (the specified time range) used for determining the ranks of usage frequency, but these values in time ranges may also be preset to values that cannot be modified by the user. However, allowing the user to set these values arbitrarily is preferable since this method gives the user more freedom to adjust the values according to the user's preferences and environment.

In the preferred embodiment described above, the user can set a desired number of virtual device names to be targeted for renaming so that only a certain number of the virtual devices ranked highest in usage frequency are renamed. However, rather than setting a number, the user may select target virtual devices to be renamed. For example, it is possible to employ a method in which virtual devices used at least once within a fixed period in the past (such as the past two months) are set as target virtual devices for renaming, while virtual devices that have not been used once in this period are not set as target virtual devices. In this case, unlike the preferred embodiment described above, the number of virtual devices targeted for renaming is indefinite However, this method can select and rank frequently used virtual devices when the number of such devices is uncertain, without requiring the user to predetermine a number.

In the preferred embodiment described above, numerals are used as the character string representing the rank of usage frequency, and the value "0", which is smaller than numerals representing rank, is assigned to newly installed virtual devices. However, the character string added to the virtual device name is not limited to this construction. For example, characters such as "A", "B", and "C" may be added to the device name to represent the rank of usage frequency. If ten or more virtual devices are to be ranked, a two-digit character string, such as "01", "02", "03", and "10", may be added. In the latter case, the character string "00" may be added to recently installed virtual devices as a value smaller than the character strings representing rank in order to arrange the virtual device names in the same order used in the preferred embodiment.

In the preferred embodiment described above, usage frequency is ranked by finding the number of printing operations within the specified time range (such as the last week) and based on the total number of printed pages when the number of printing operations is the same for a plurality of virtual devices. However, it is also possible to rank usage frequency based solely on the total number of printed pages, without regard for the number of printing operations within the specified time range.

What is claimed is:

1. A data processing device comprising:
a processor configured to execute instructions that cause the processor to provide functional units including:
a registering unit that registers a plurality of communicable printers as a plurality of virtual devices;
a usage frequency recording unit that records usage frequencies of the virtual devices;
a virtual device renaming unit that changes a name of a virtual device of the plurality of virtual devices to a second name, a part of the second name being different from the name of the virtual device and indicating the recorded usage frequency of the virtual device; and
a display unit that displays virtual device names of the virtual devices whose names are unchanged by the virtual device renaming unit, and the second name,
wherein the virtual device renaming unit adds a character string to the virtual device name, the character string representing a rank of usage frequency.

2. The data processing device according to claim 1, wherein the virtual device renaming unit adds the character string to a head of the virtual device name to provide the second name, and the display unit displays and sorts the virtual device names and the second name to be arranged in a predetermined order.

3. The data processing device according to claim 1, wherein the virtual device renaming unit renames a predetermined number of the virtual device names selected from the plurality of the virtual device names, the predetermined number of the virtual device names having higher ranks for usage frequency than a remaining part of the predetermined number of the virtual device names.

4. The data processing device according to claim 3, wherein the predetermined number of the virtual device names for the virtual devices is user-defined.

5. The data processing device according to claim 1, wherein the usage frequency recording unit comprises:
a printing history recording unit that records data indicating execution of a printing operation as a printing history each time a printing operation is executed using one of the virtual devices; and
a frequency recording unit that sets and records the usage frequency for each of the plurality of virtual devices based on printing history data recorded by the printing history recording unit within a specified time period.

6. The data processing device according to claim 1, wherein the specified time period is user-defined.

7. The data processing device according to claim 1, wherein the virtual device renaming unit comprises a determining unit that determines whether a virtual device has been newly installed, the virtual device renaming unit adding an identifying character string to a virtual device name of a newly installed virtual device when the determining unit determines that the virtual device is the newly installed virtual device.

8. The data processing device according to claim 7, wherein the identifying character string indicates that a virtual device is a new virtual device, the virtual device renaming unit adding the identifying character string to an end of the virtual device name.

9. The data processing device according to claim 7, wherein the determining unit determines whether a virtual device is a newly installed virtual device based on whether an amount of time that has elapsed since the virtual device was installed is shorter than a prescribed time period.

10. The data processing device according to claim 9, wherein the prescribed time period is user-defined.

11. The data processing device according to claim 7, wherein the display unit displays and sorts the plurality of device names for the plurality of virtual devices to be arranged in a predetermined order, and
the virtual device renaming unit adds a first character string indicating a rank of usage frequency to a head of the virtual device name of the virtual device other than the new virtual device and a second character string to a head of the virtual device name of the new virtual device such that the virtual device name including the second character string is displayed in a higher position than the virtual device name including the first character string when sorting and displaying the plurality of virtual device names according to the predetermined order.

12. The data processing device according to claim 11, wherein the first character string is composed of a number of a prescribed number of digits representing the rank of usage frequency, and the second string is composed of number of "0" for each of the prescribed number of digits.

13. The data processing device according to claim 1, wherein the virtual device renaming unit changes the virtual device name when a printing operation is performed using the virtual device.

14. The data processing device according to claim 1, wherein when a new virtual device is installed, the virtual device renaming unit changes the virtual device name of the virtual device.

15. The data processing device according to claim 1, wherein when one of the virtual devices is uninstalled, the virtual device renaming unit changes the virtual device name of the virtual device.

16. A non-transitory computer readable medium containing a virtual device renaming program that, when executed, configures a data processing device to register a plurality of communicable printers as a plurality of virtual devices, display a plurality of virtual device names for the plurality of virtual devices, prompt a user to select one of the plurality of virtual devices, and transmit print data to a printer corresponding to a selected virtual device, the virtual device renaming program comprising:
  a program for recording usage frequencies of the virtual devices; and
  a program configured to change a name of at least one of the virtual devices of the plurality of virtual devices to a second name, wherein a part of the second name is different from the name of the virtual device and indicative of the recorded usage frequency of the virtual device,
  wherein the virtual device renaming program includes an adding program for adding a character string to the virtual device name, the character string representing a rank of usage frequency.

17. The non-transitory computer readable medium containing the virtual device renaming program according to claim 16, wherein the adding program adds the character string to a head of the virtual device name to provide the second name, the data processing device being configured to display and sort the virtual device names and the second name to be arranged in a predetermined order.

18. The non-transitory computer readable medium containing the virtual device renaming program according to claim 16, the renaming program renames a predetermined number of the virtual device names selected from the plurality of the virtual device names, the predetermined number of the virtual device names having higher ranks for usage frequency than a remaining part of the predetermined number of the virtual device names.

19. The non-transitory computer readable medium containing the virtual device renaming program according to claim 18, wherein the predetermined number of the virtual device names for the virtual devices is user-defined.

20. The non-transitory computer readable medium containing the virtual device renaming program according to claim 16, wherein the recording program comprises a printing history recording program for recording data indicating execution of a printing operation as a printing history each time a printing operation is executed using one of the virtual devices; and a frequency recording program for setting and recording the usage frequency for each of the plurality of virtual devices based on printing history data recorded in the printing history recording program within a specified time period.

21. The non-transitory computer readable medium containing the virtual device renaming program according to claim 20, wherein the specified time period is user-defined.

22. The non-transitory computer readable medium containing the virtual device renaming program according to claim 16, wherein the renaming program comprises a determining program for determining whether a virtual device has been newly installed, and an adding program an identifying character string to a virtual device name of a newly installed virtual device when the determining program determines that the virtual device is the newly installed virtual device.

23. The non-transitory computer readable medium containing the virtual device renaming program according to claim 22, wherein the identifying character string indicates that a virtual device is a new virtual device, the adding program adding the identifying character string to an end of the virtual device name.

24. The non-transitory computer readable medium containing the virtual device renaming program according to claim 22, wherein the determining program determines whether a virtual device is a newly installed virtual device based on whether an amount of time that has elapsed since the virtual device was installed is shorter than a prescribed time period.

25. The non-transitory computer readable medium containing the virtual device renaming program according to claim 24, wherein the prescribed time period is user-defined.

26. The non-transitory computer readable medium containing the virtual device renaming program according to claim 22, wherein the data processor is configured to sort and display the virtual device names and the second name to be arranged in a predetermined order; and
  the adding program adds a first character string indicating a rank of usage frequency to a head of the virtual device name of the virtual device other than the new virtual device and a second character string to a head of the virtual device name of the new virtual device such that the virtual device name including the second character string is displayed in a higher position than the virtual device name including the first character string when sorting and displaying the plurality of virtual device names according to the predetermined order.

27. The non-transitory computer readable medium containing the virtual device renaming program according to claim 26, wherein the first character string is composed of a number of a prescribed number of digits representing the rank of usage frequency, and the second string is composed of number of "0" for each of the prescribed number of digits.

28. The non-transitory computer readable medium containing the virtual device renaming program according to claim 16, wherein the renaming program is executed when a printing operation is performed using the virtual device.

29. The non-transitory computer readable medium containing the virtual device renaming program according to claim 16, wherein the renaming program is executed when a new virtual device is installed.

30. The non-transitory computer readable medium containing the virtual device renaming program according to claim 16, wherein the renaming program is executed when one of the virtual devices is uninstalled.

31. A data processing device comprising:
  a processor configured to execute instructions that cause the processor to provide functional units including:
    a registering unit that registers a plurality of communicable printers as a plurality of virtual devices;
    a usage frequency recording unit that records usage frequencies of the virtual devices;
    a virtual device renaming unit that changes a name of a virtual device of the plurality of virtual devices to a second name, a part of the second name being different from the name of the virtual device and indicating the recorded usage frequency of the virtual device; and a display unit that displays virtual device names of the virtual devices whose names are unchanged by the virtual device renaming unit, and the second name, wherein the virtual device renaming unit renames a predetermined number of the virtual device names selected from the plurality of the virtual device names, the predetermined number of the virtual device names having higher ranks for usage frequency than a remaining part of the predetermined number of the virtual device names.

32. A non-transitory computer readable medium containing a virtual device renaming program that, when executed, configures a data processing device to register a plurality of communicable printers as a plurality of virtual devices, display a plurality of virtual device names for the plurality of virtual devices, prompt a user to select one of the plurality of virtual devices, and transmit print data to a printer corresponding to a selected virtual device, the virtual device renaming program comprising:

a program for recording usage frequencies of the virtual devices; and a program configured to change a name of at least one of the virtual devices of the plurality of virtual devices to a second name, wherein a part of the second name is different from the name of the virtual device and indicative of the recorded usage frequency of the virtual device, wherein the virtual device renaming program renames a predetermined number of the virtual device names selected from the plurality of the virtual device names, the predetermined number of the virtual device names having higher ranks for usage frequency than a remaining part of the predetermined number of the virtual device names.

* * * * *